(12) United States Patent
Ferrari

(10) Patent No.: US 9,174,477 B2
(45) Date of Patent: Nov. 3, 2015

(54) PRINTED ARTICLE AND METHOD OF MAKING SAME

(75) Inventor: Michael G. Ferrari, Sycamore Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1118 days.

(21) Appl. No.: 12/004,323

(22) Filed: Dec. 20, 2007

(65) Prior Publication Data

US 2009/0158951 A1 Jun. 25, 2009

(51) Int. Cl.

| | |
|---|---|
| *B41M 1/14* | (2006.01) |
| *C09D 11/02* | (2014.01) |
| *B44F 1/08* | (2006.01) |
| *C09D 11/037* | (2014.01) |
| *B41M 3/00* | (2006.01) |
| *B41M 1/18* | (2006.01) |
| *B41M 1/16* | (2006.01) |
| *H04N 1/54* | (2006.01) |
| *H04N 1/60* | (2006.01) |

(52) U.S. Cl.
CPC . *B41M 1/14* (2013.01); *B41M 1/16* (2013.01); *B41M 1/18* (2013.01); *B41M 3/008* (2013.01); *B44F 1/08* (2013.01); *C09D 11/02* (2013.01); *C09D 11/037* (2013.01); *H04N 1/54* (2013.01); *H04N 1/60* (2013.01); *B65D 2203/00* (2013.01); *B65D 2203/02* (2013.01)

(58) Field of Classification Search
CPC ............ B41M 1/14; B41M 1/16; B41M 1/18; B41M 3/008; B44F 1/08; C09D 11/02; C09D 11/037; B65D 2203/00; B65D 2203/02
USPC .................... 428/195.1, 206, 212, 323, 913.3
See application file for complete search history.

(56) References Cited

U.S. PATENT DOCUMENTS

| 5,181,068 A | 1/1993 | Morikawa |
| 5,493,321 A | 2/1996 | Zwadlo |
| 5,751,326 A * | 5/1998 | Bernasconi .................... 347/115 |
| 5,766,738 A * | 6/1998 | Phillips et al. ................ 428/200 |
| 2003/0156299 A1 | 8/2003 | Martinez et al. |
| 2005/0231576 A1 | 10/2005 | Lee et al. |
| 2007/0153309 A1* | 7/2007 | Sasanuma et al. ............. 358/1.9 |

FOREIGN PATENT DOCUMENTS

| JP | A2003221527 | 8/2003 |
| WO | WO-2007/137624 A | 12/2007 |

OTHER PUBLICATIONS

Opaltone website: www.opaltone.com, homepage, printers, carbon footprint, as of Mar. 20, 2008.
Pantone® /Hexachrome website: www.pantone.com, homepage, ColorSuite® sample; printers, as of Mar. 20, 2008.
Pantone Inc.: "Color Just Got Bigger for 2005 with the New Pantone Color Guides", Jan. 24, 2005, Carlstadt, NJ, press release from internet: http://www.colorinstitute.pantone.com/pages/pantone/pantone.aspx?pg=20265&ca=10>2 pages.
International search report dated Apr. 27, 2009, 5 pages.

* cited by examiner

*Primary Examiner* — Betelhem Shewareged
(74) *Attorney, Agent, or Firm* — David K Mattheis

(57) ABSTRACT

An article is printed based upon predetermined artwork. The artwork includes the specification of a palette of ink colors to be used in printing the article. Each of the colors is specified by a full tone color target and an undertone color target. Each ink formulation has a combined full tone L-C-H-a-b dE equal to or less than about 2, and a combined undertone dE less than or equal to about 3. The specification of ink colors may also include a light fastness value. The ink colors may be further specified by way of a proofing index value.

7 Claims, 1 Drawing Sheet

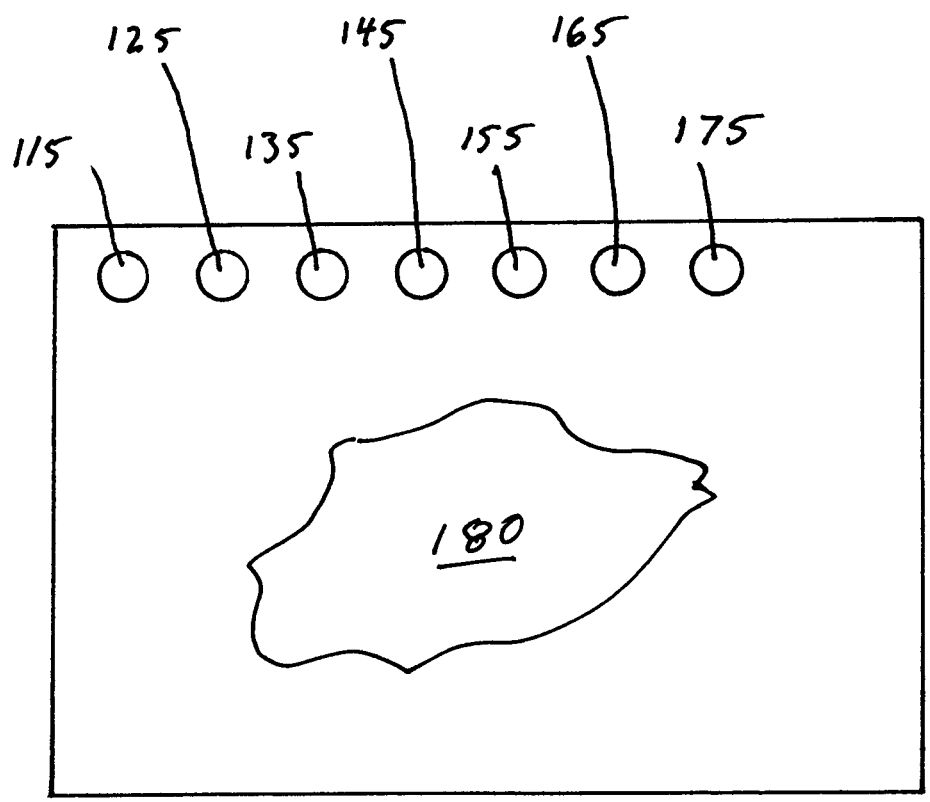

PRINTED ARTICLE AND METHOD OF MAKING SAME

FIELD OF THE INVENTION

The present invention relates to printed articles and to methods of printing these articles. The invention relates particularly to articles printed using a palette of inks with each individual ink satisfying a combination of requirements.

BACKGROUND OF THE INVENTION

Printed articles and methods of printing are well known in the arts. Articles printed using multiple station presses and color palettes of multiple inks are also known. Half tone and full tone printing is utilized to decrease and increase the intensity of particular colors in the appearance of the finished article. Composite appearances, wherein combinations of the colors in a limited palette of inks are printed to yield a color outside the palette are also known. Inks are specified using either an L-a-b value, an L-C-H value, or an L-C-H-a-b value. A delta-e value (dE) for each ink color is also specified to provide the color variation which is acceptable for each color of the printing ink palette.

The dE for each color represents the extent by which each ink used may be separated from the color actually desired in a map of the overall color space. The variation can be considered a distance between the desired and actual colors. Delta-e is expressed as a magnitude only, with no directional component supplied. Because of this form of specifying the ink color, the actual tolerance for ink color variation is a sphere within the color space having a center at the position of the desired color and a radius of delta-e. In applications wherein the colors of the finished article are composites of the underlying palette, it is common for the cumulative effects of the base color variations to result in composite colors which exceed the accepted level of color variation from the desired composite color. Such an excess variation may result in a rejection of the finished article.

What is needed is a method for printing articles wherein the specification of the ink palette colors will result in the use of appropriate inks yielding printed colors which are within the acceptable color tolerance limits of the desired colors.

SUMMARY OF THE INVENTION

In one embodiment a printed article comprises a substrate and a combination of printed inks. The inks comprise six distinctly colored inks. Each of the colors is specified by a target color having a full tone color target and an undertone color target. Each of the six printed inks has a combined full tone L-C-H-a-b dE equal to, or less than, about 2. Each of the six printed inks has a combined undertone dE less than, or equal to, about 3.

A method for printing articles includes preparing an electronic data file of desired artwork including desired colors for the respective elements of the artwork. The artwork is proofed by printing the data file using a digital printing press. The printing press settings are associated with the electronic artwork file. Copies of the associated printing press settings and electronic artwork data files are provided to multiple printing locations. Copies of the article are printed at multiple locations utilizing the printing press settings and associated electronic artwork data files.

BRIEF DESCRIPTION OF THE DRAWINGS

The FIGURE is a schematic illustration of an embodiment of the invention.

DETAILED DESCRIPTION OF THE INVENTION

A printed article includes a substrate and artwork printed upon the substrate. The article may comprise packaging materials, labels, packages, or other printed materials as are known in the art. The substrate may be any material known in the printing arts for use as a substrate. Exemplary substrates include polymeric films and other polymeric material, respective grades of paper ranging from tissue grades to corrugated cardboard, Kraft paper, to clay finished chipboards. Metalized films and metal foils may also be used as the substrate. The base substrate may be coated as is known in the art in preparation for receiving the printed artwork. The article may receive protective and decorative finishes after the artwork has been printed upon the substrate. The printed substrate may be further processed as part of a packing converting process or may be complete once printed.

The design for the artwork of a printed article may be prepared, configured or simply saved as an electronic data file. The artwork may incorporate data relating to the desired or specified colors for the respective elements of the article. The artwork and color palette specification may include an ink palette specification. The ink palette may comprise six distinct color specifications and may further include a requirement for the inclusion of a black ink. The limited seven ink palette may be used to yield a spectrum of hundreds of composite colors in the finished printed article. Each of the specifications for the colors in the ink palette may include L-C-H-a-b values, L-C-H value or L-a-b values for the full tone color. The ink colors may be further specified by providing an undertone color target.

The specification of the palette through the use of the full tone and undertone values defines a color space. The artwork may then be designed using colors from the defined color space. To achieve printed articles which faithfully reproduce the designs, the inks used in the printing process must be capable of reproducing not only the full tone as specified, but must also reproduce the designated undertones. The colors of the finished printed article may comprise full tones and combinations of undertones to achieve colors from throughout the color space.

The inks used by the printer may be required to satisfy both a full tone and undertone color matching specification. In one embodiment, the ink formulations may be required to have a combined full tone L-C-H-a-b delta-e equal to, or less than about 2. One of skill in the art will appreciate that the combined full tone delta-e value is simply the combination of the delta-e values for each of the L-C-H-a-b factors. The inks may be further specified by the requirement that the 50% undertone have a combined delta-e equal to or less than about 3 in reference to the target 50% undertone color.

The undertone dE may be determined once the ink formulation successfully satisfies the full tone dE requirement. The successfully formulated ink is used to print a tonal range from 100% full tone to no tone at all. The combined dE for the undertone best corresponding to the target 50% undertone, (best corresponding defined as having an L factor equal to or less than 1 relative to the target undertone) is determined relative to the target undertone. In one embodiment a combined dE equal to or less than 3 is required. The ink may require reformulating to satisfy the undertone dE requirement. The newly formulated ink should be test to confirm that the full tone dE requirement is still satisfied.

The use of base ink formulations which satisfy the full tone specification and the 50% undertone requirement reduces the likelihood of unmatched composite colors in the finished article.

The ink palette specification may further restrict the printer to the use of ink formulations having no more that two pigments per ink. Such a limitation may limit the number of variables in the formulation and reduce the likelihood of color variations in the formulated ink.

The ink palette specification may also incorporate a light fastness requirement. Light fastness relates to the stability of the ink color upon exposure to radiant energy over time. Inks having a low degree of light fastness may undergo a degradation of appearance and an alteration in the perceived color upon exposure to even low intensity light sources of low energy spectra.

Articles intended for use as product advertising and product packaging may have minimally acceptable levels of color light fastness to ensure a stable and desired appearance over the anticipated lifecycle of the article. In one embodiment the ink formulations may be specified as requiring a lightfastness value of at least about 5. For uses where the article may be exposed to intense light sources, a higher lightfastness of 6, 7 or even 8 may be required.

ISO 105-B02, Color Fastness to Artificial Light: Xenon Arc Fading Lamp Test, may be used to determine the light fastness of an ink formulation. In this test, samples of the printed ink and standardized samples of wool, colored with blue dyes expressed as having a light fast range from 1 to 8, are exposed to a xenon arc lamp until the ink samples demonstrate a color change in comparison to unexposed sample corresponding to a grey scale change of three. At this time, the exposed wool samples are compared to unexposed wool samples. If the number 5 wool sample has undergone at least a grey scale change of 3, the ink is considered to have a blue wool scale (BWS) lightfastness of at least 5.

The ink palette may further specify that ink formulations be within the color spaces of standard print proofing systems. KODAK™ and NEC™ print proofing systems have color spaces within the systems which may compose artwork to be proofed. The color spaces are finite. The selection of ink formulations outside the color spaces of standard proofing systems may result in artwork which cannot be adequately proofed prior to the more costly process step of a press run of the finished article. A specification that an ink formulation has a proof rating of 1 provides that the ink may be successfully be proofed using standard proofing printers. Inks which may not be proofed have a proof rating of 0.

The selection of a particular palette of colors defines a corresponding color space or spectrum of colors. The corresponding color space may be used to limit or restrict the color selection choices made during the design or artwork for an article. A plurality of articles designed using a common color space to limit the colors selected may subsequently be printed using a common set of inks. When the set of articles has additional commonalities relating to the nature of the substrate and the size of the printed areas, a single printing press may be used to print multiple articles having different artwork and differing composite colors in the artwork without any need to change the inks being used in the printing process.

In one embodiment a first article may be printed in a desired quantity and a second article having artwork that is distinct from the first article may be subsequently printed upon the same press without any need to change ink colors or to undergo the associated cleaning procedures necessary when changing ink colors.

In one embodiment the color palette for a printed article comprises: a first ink having LCHab values of between about 61 and 64, 56 and 59, 224 and 227, −39 and −40, and −39 and −42; a second ink having LCHab values of between about 53 and 56, 59 and 63, 358 and 4, 59 and 63, and −1 and 4; a third color having LCHab values of between about 92 and 93, 87 and 88, 88 and 89, 2 and 3, 87 and 88; a fourth color having LCHab values of between about 73 and 74, 80 and 81, 48 and 49, 53 and 54, and 60 and 61; a fifth color having LCHab values of between about 66 and 67, 64 and 65, 158 and 159, −60 and −61, and 23 and 24; and a sixth color having LCHab values of between about 51 and 52, 49 and 50, 263 and 264, −5 and −6, and −49 and −50.

The articles may be printed using analog or digital printing presses. The use of a digital printing press allows the article to be proof printed upon the digital press from the electronic data file for the artwork. Upon successful proofing of the article using the digital press, the printing press settings associated with the proof may be associated with the artwork file. The artwork and press setting may be provided to multiple locations and may be used upon multiple presses to yield substantially identical articles from different presses. The setting and data files may be provided to the respective locations using any means known in the art for the distribution of data.

The articles may be printed using a combination of analog and digital printing stations. The articles may be printed using flexographic or gravure methods. The article may comprise proofing squares, segments, or spots. Each proofing segment may consist of a single color from the palette. In one embodiment the segments comprise a composite color of the finished design. The proofing segments may be incorporated into the final article or, as in the case of some labels, may comprise a portion of an intermediate form of the article.

The articles may be printed using less than the full palette of colors by disengaging printing at one or more print stations. In one embodiment the articles may comprise additional spot ink colors to attain artwork colorations outside the color space achievable with the color palette.

The FIGURE illustrates an article according to the invention. Article 100 comprises substrate 110 and inks 115, 125, 135, 145, 155, 165, and 175 each printed in a proofing spot as well as printed together in a composite image 180.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A printed article comprising, a substrate and a combination of printed inks, the inks comprising six colors, each of the colors specified by a full tone color target and an undertone color target, each ink having a combined full tone L-C-H-a-b dE equal to or less than about 2, and a combined undertone dE less than or equal to about 3.

2. The printed article of claim 1 wherein the inks are combined on the article to yield perceived colors beyond the six ink colors.

3. The printed article of claim 1 further comprising a black ink.

4. The printed article according to claim 1 wherein each of the six colors consists of one or two pigments.

5. The printed article according to claim 1, wherein each of the inks has a blue wool scale light fastness of at least about 5.

6. The article according to claim 1 wherein each ink has a proofing value of 1.0.

7. A printed article comprising, a substrate, and a combination of printed inks, the inks comprising six colors,
each of the six colors consisting of one or two pigments,
each of the colors specified by a full tone color target and an undertone color target, each ink having a combined full tone L-C-H-a-b dE equal to or less than about 2, and a combined undertone dE less than or equal to about 3, and
each of the inks having a blue wool scale lightfastness value of at least about 5,
a first ink having Lab values of between about 61 and 65, about −39 and −41, and about −39 and −43,
a second ink having lab values of between about 53 and 56, about 59 and 63, and about −1 and 5,
a third color having Lab values of between about 92 and 93, about 2 and 3, and about 87 and 88,
a fourth color having Lab values of between about 73 and 74, about 53 and 54, and about 60 and 61,
a fifth color having Lab values of between about 66 and 67, about −60 and −61, and about 23 and 24,
a sixth color having Lab values of between about 51 and 52, about −5 and −6, and about −49 and −50.

* * * * *